(12) United States Patent
Nickson

(10) Patent No.: US 8,706,909 B1
(45) Date of Patent: Apr. 22, 2014

(54) SYSTEMS AND METHODS FOR SEMANTIC URL HANDLING

(71) Applicant: University of North Dakota, Grand Forks, ND (US)

(72) Inventor: James B. Nickson, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 0 days.

(21) Appl. No.: 13/751,619

(22) Filed: Jan. 28, 2013

(51) Int. Cl.
*G06F 17/30* (2006.01)

(52) U.S. Cl.
USPC ............... 709/245; 709/203; 709/220; 707/3

(58) Field of Classification Search
USPC ................. 709/203, 220, 224, 245; 707/3, 6
See application file for complete search history.

(56) References Cited

U.S. PATENT DOCUMENTS 6,363,380 B1 * 3/2002 Dimitrova ..................... 707/740
6,731,735 B1 * 5/2004 Cook ........................ 379/207.11
6,976,019 B2 * 12/2005 Davallou .......................... 1/1

OTHER PUBLICATIONS

"Google Search: URL Site: Tools", http://tools.ietf.org/html/rfc3986, 1 pg.
"htacess tips and tricks . . . part two: url rewriting with mod rewrite", http://corz.org/serv/tricks/htaccess2.php?page=1, 29 pgs.
"Simone Carletti's Blog; Apache .htaccess query string redirects", http://www.simonecarletti.com/blog/2009/01/apache-query-string-redirects/, 11 pgs.
Berners, Lee T., et al., "Uniform Resource Identifiers (URI): Generic Syntax", RFC 2396, (Aug. 1998), 40.
Berners, T., et al., "RFC 1738: Uniform Resource Locators (URLs)", Network Working Group, (Dec. 1994), 1-25.
Berners-Lee, "Uniform Resource Identifier", (Jan. 2005), 57 pgs.

* cited by examiner

*Primary Examiner* — Khanh Dinh
(74) *Attorney, Agent, or Firm* — Schegman, Lundberg & Woessner, P.A.

(57) ABSTRACT

Discussed generally herein are systems and techniques for the semantic handling of uniform resource locator (URL). In one or more embodiments a web server can be configured to receive a first URL, identify one or more search strings in the URL, identify the one or more search strings in a list of valid search strings, and redirect to a second, valid URL as function of the one or more search strings.

14 Claims, 7 Drawing Sheets

400A

```
Redirect (keyword, url)
charstring url;
    If keyword = (car or cars or cr or crs or kars or kar)
        Then url = http://acmecorp.org/^looneytunes/$products/
        !!roadrunnertrappingdevices!!/*cars*;
    If keyword = (portable hole or portable holes or ortbl hole
    or prtbl holes or portable whole or prtbly hl or portabl
    hole or hole or whole)
        Then url = http://acmecorp.org/^looneytunes/$products/
        !!roadrunnertrappingdevices!!/00portable holes00;
    else url = http://acmecorp.org/keywordhelp;
    return url; end
```

```
Phonetic_Redirect (keyword, url)
charstring url;
    If (phonetically_similar (keyword, (car or cars)))
        Then url = http://acmecorp.org/^looneytunes/$products/
        !!roadrunnertrappingdevices!!/*cars*;
    If (phonetically_similar (keyword, (portable hole or hole)))
        Then url = http://acmecorp.org/^looneytunes/ $products/
        !!roadrunnertrappingdevices!!/ 00portable holes00;
        else url = http://acmecorp.org/keywordhelp;
        };
    return url; end
```

*FIG. 4B*

SYSTEMS AND METHODS FOR SEMANTIC URL HANDLING

TECHNICAL FIELD

The present disclosure relates to universal resource locator (URL) redirects, and more specifically, to semantic URL redirects.

BACKGROUND

Typical web servers treat a URL entry as a command. The user types in a URL, causes the URL to be sent to the web server, and the web server is configured to respond by causing the user's browser to display the content of the webpage corresponding to the URL. When the user enters an invalid URL the web server can send a URL that displays an error message. The user then has to figure out where they made a mistake in entering the URL. As URLs can be quite complex and include a large number of characters, numbers, symbols, or letters, finding the mistake in the URL can be an onerous task.

BRIEF DESCRIPTION OF THE DRAWINGS

Aspects of the present disclosure are illustrated by way of example and are not limited by the accompanying figures with like references indicating like elements.

FIG. 4A shows an example of pseudo code for semantic URL handling.

FIG. 4B shows an example of a pseudo code for semantic URL handling.

DETAILED DESCRIPTION

Figure 1:
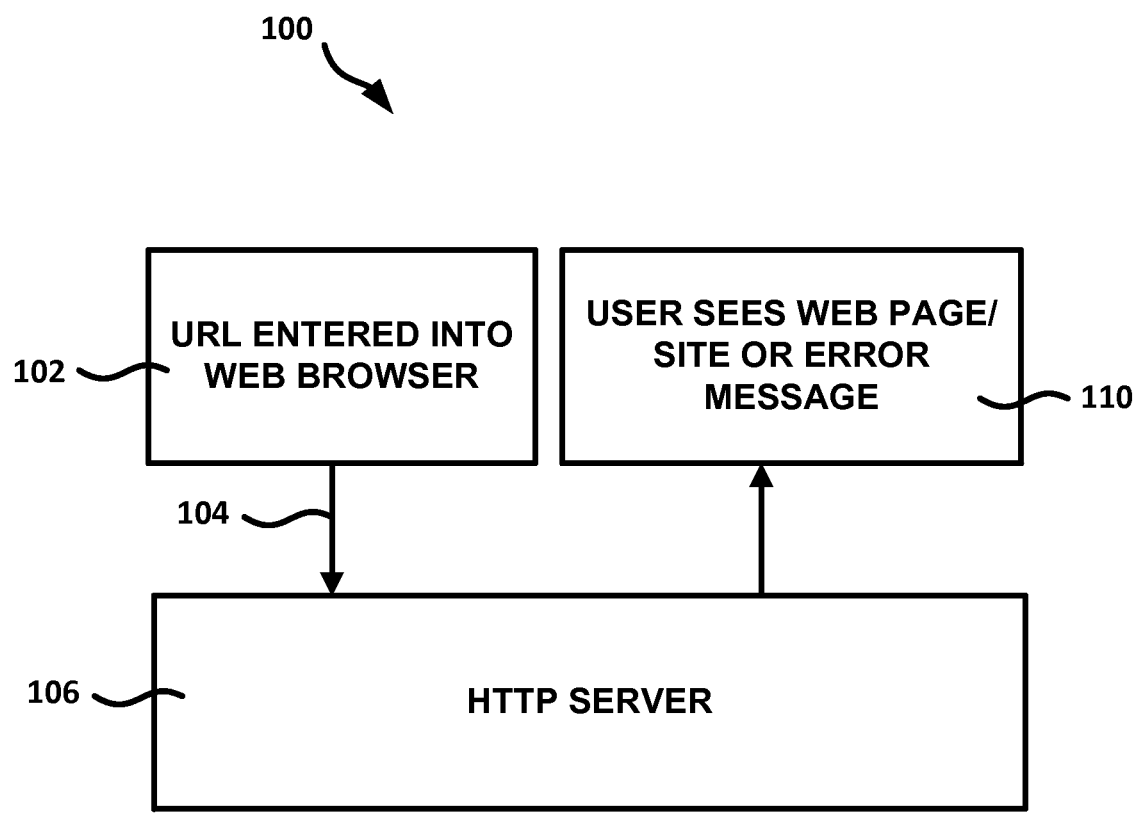
FIG. 1 shows a flow diagram of an example of a technique for URL handling.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

In one or more embodiments, a web server can be configured to treat text that is entered or typed into the URL box of a web browser as part of a conversation, or to treat that text as a sort of exchange of information or suggestions. For example, a web server can be configured to receive a first URL, identify one or more search strings (e.g., keywords, phrases, logical search strings, numbers, letters, symbols, characters, or a combination thereof) in the URL, identify the one or more search strings in a list of valid search strings, and redirect to a second, valid URL as function of the one or more search strings. As use herein a "valid URL" means a URL that includes a result code that is "normal" (e.g., a result code of 200), rather than a result code that is "page not found" (e.g., a result code of 404) or "server error" (e.g., a result code of 5XX, where XX is a two digit whole number). If the one or more identified search strings are not in the list of valid search strings, the web server can direct the user's browser to a web page that displays a list of valid search strings or corresponding URLs. The conversation can continue by the user choosing a URL or a search string on the web page of search strings and corresponding URLs and the web server directing the user's web browser to display the contents of the web site/page corresponding to the chosen URL or URL associated with the search string chosen. Systems and techniques discussed herein can be compatible with current web navigation techniques and standards. Entering text can include cutting and pasting, dragging and dropping, speech recognition, motion recognition, or other way of providing text.

Web sites/pages can be configured to include search strings common to the web sites, such as "about", "contact", "phone", "email", "blog", "personnel", or others. Search strings can also be web site/page specific. For example a web site/page for a university can include the search string "professor" or a company that sells food can include the search string "caviar". The search string(s) or a search string list can be augmented by using a phonetic matching system to match phonetically similar search strings to the same URL(s). Such a configuration can be helpful to ensure that common misspellings are directed or redirected to the same URL and can enhance the search string matching capability of the system by making the list of valid search strings bigger.

Systems discussed herein can be operative without the need for profiling. Profiling can include knowing demographic information about a user, such as sex, race, age, or other demographic information. Profiling can also include retaining the location of the user or web sites/pages known to be visited by the user. Profiling can result in different users getting redirected to different web sites when the different users enter the same URL, search strings, or query. The systems discussed herein can send these different users to same URL. In other words, the systems discussed herein can be operative independent of profiling. An advantage of profiling independence can include improved user privacy.

Systems discussed herein can be used with vocal recognition software, or motion recognition software, such as gesture recognition or eye tracking. In one or more embodiments, the user of such a system can navigate to the desired URL through a "topic" or "help" page, such as the web site/page shown in FIG. 2D.

Referring now to FIG. 1, an example of a non-semantic technique 100 for URL handling can include a user entering a URL into a web browser. The web browser can send 104 the URL to a HyperText Transfer Protocol (HTTP) server 106 using an HTTP protocol. The HTTP server 106 can direct the user's web browser to a web page/site or send an error message to the web browser 110. Error messages can include a server error or an indication that the page was not found.

Figure 2:
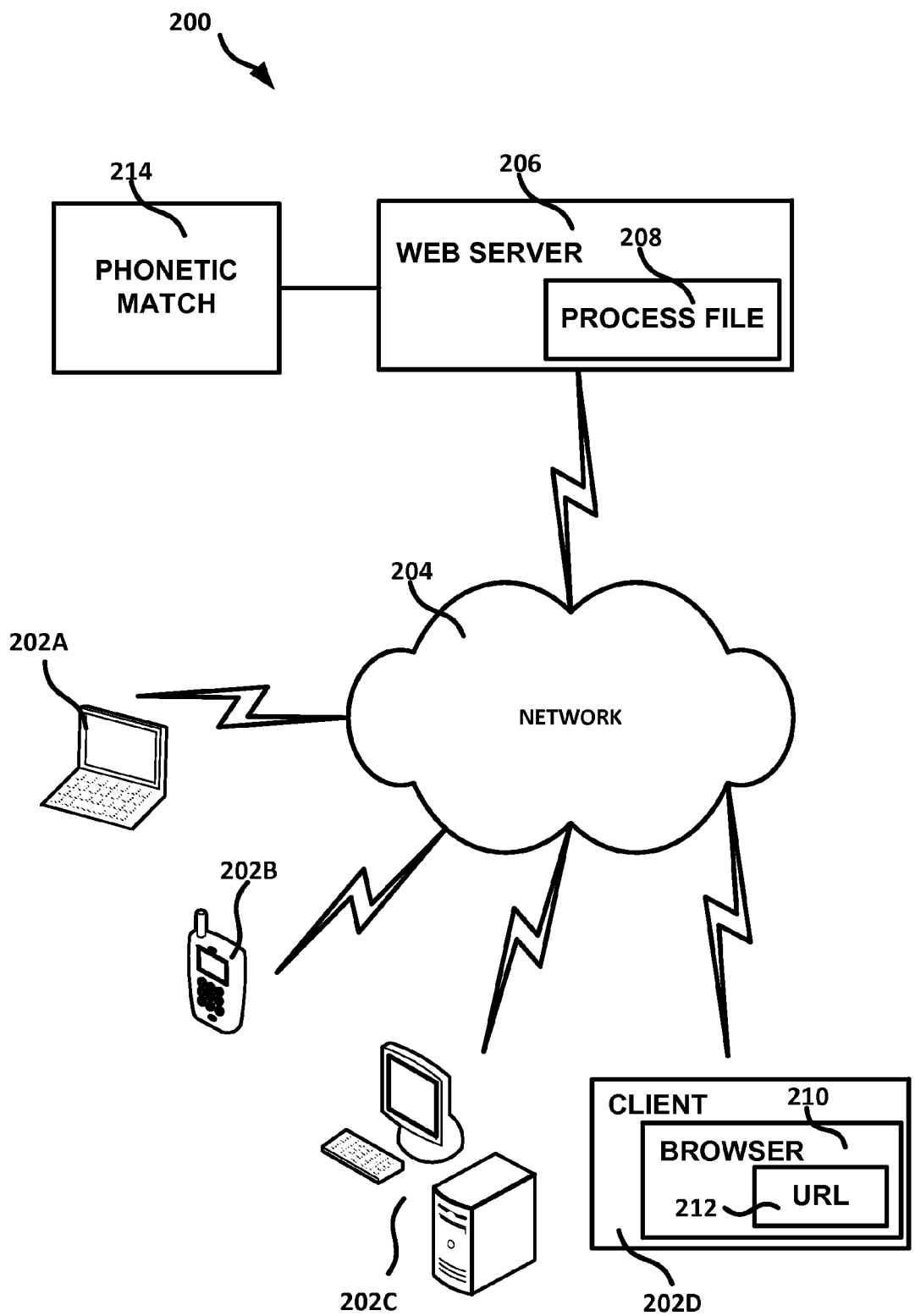
FIG. 2 shows a block diagram of an example of a system for semantic URL handling.

FIG. 2 shows a system 200 for semantic URL handling. The system 200 can include one or more devices 202A, 202B, 202C, or 202D communicatively coupled to a network 204 or to a web server 206. The web server 206 can be directly or indirectly coupled to the devices 202A-D. An indirect communicative coupling can be a wired or wireless coupling to the device 202 through the network 204. A direct communicative coupling can be a wired or wireless coupling between the web server 106 and the device 202.

A device 202A-D can be configured to communicate to the web server 206 through the network 204 or communicate directly with the web server 206. The device 202A-D can be a laptop, mobile phone, a desktop computer, or other type of device 202D that is configured to communicate with the web server 206 through a browser 210 that displays web sites/pages, such as a URL 212. The device 202 can be configured to transmit a URL to a web server 206. A user can enter the URL into a web browser 210 or use voice recognition technology to command the device 202 to transmit the URL or one or more search strings to the web server 206.

The web server 206 can be an Apache™, Microsoft® Internet Information Server® (IIS), Sun®, NGINX®, Google®, National Center for Supercomputing Applications (NCSA), or other type of web server 206. The web server 206 can include a process file 208 that defines action(s) the web server 206 can perform in certain, specified circumstances. Some example circumstances include what the server should do when a URL or URL error message is received. The process file 208 can include computer code created by a web master, flat file formatted information, a comma separated values list, or other representation that is readable by a computer and can include a list of valid search strings 328 or the corresponding URL list 328 (see FIG. 3). The computer code can be written in a language such as eXtended Markup Language (XML), HyperText Markup Language (HTML), C, Python, Perl, or other computer code language. Example pseudo computer code 400A and 400B is shown in FIGS. 4A-B. The process file 208 can, alternatively, reside on the device 202A-D and be configured to examine or format a URL sent to the web server 206 from the device. The process file 208 can, alternatively, reside on a server that is accessible by the web server 206, such as on a Structured Query Language (SQL) or Indexed Sequential Access Method (ISAM) database.

The web server 206 can be communicatively coupled to a phonetic matching module 214. The phonetic matching module 214 can be configured to receive a word as an input and produce phonetically similar words as an output. The phonetically similar words can be added to a search string list in the process file 208 or a memory location accessible by the web server 206. The phonetic matching module 214 can implement a Soundex, simple metaphone, double metaphone, Beider-Morse Phonetic Matching, a fuzzy matching, or other type of phonetic matching algorithm.

The phonetic matching module 214 can be configured to receive a word as an input and produce a code (e.g., a number, character string, or combination thereof) as a function of the input. The code can be saved in the process file 208 or other memory location accessible by the web server 206. The search string(s) in the URL that are received at the web server 206 can be converted to a code using the same algorithm. These codes can then be compared to the codes associated with the search string(s) in the list to determine if the search string(s) received is phonetically similar to a search string(s) in the list. When a received search string is similar to a search string(s) in the list then the web server 206 can direct the user to the web site/page corresponding to the similar search string(s) in the list by redirecting the user the web site/page.

Alternatively, the web server 206 can redirect the user's web browser 210 to a list of valid search strings which can include a corresponding list of suggested URLs to choose from. In this fashion, the web server 206 can suggest many different URLs for the same, single search string. The lists of valid search strings or suggested URLs can be created as a function of the phonetic similarity of the search string(s) received to the search string(s) in the list of valid search strings. The amount of phonetic similarity can be dependent on the phonetic matching algorithm used.

A web master can include other not-necessarily-phonetically-similar words in the list of valid search strings. For example, if a user is looking to access the web page of a person known as "Billy Goat", the web master can include the names "William Goat" or "Will Goat", among others, in the list of valid search strings.

In one or more embodiments, such as when there are no, or just a few, search strings in the list that are phonetically similar to the received search string(s) or when there are multiple URLs that correspond to the search string(s) received, the web server 206 can redirect the user to a web site/page that displays a list of valid, search strings or their corresponding URLs. In one or more embodiments, the web server can provide suggested search strings or URLs to the user as a function of the received search strings or their phonetic similarity to a search string in the list of valid search strings.

Figure 3A:
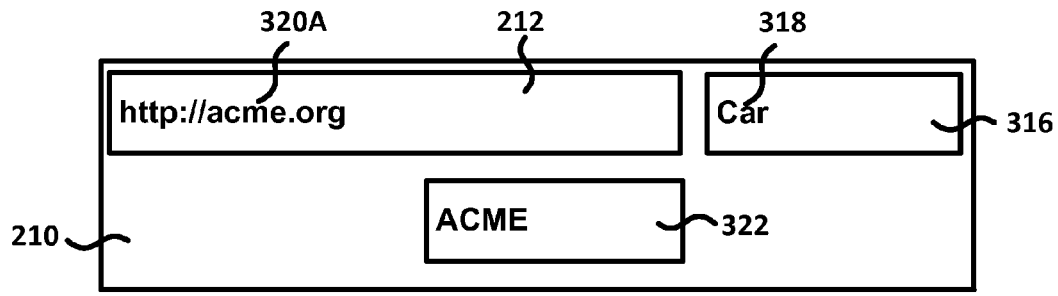
FIG. 3A shows a block diagram of an example of a web browser.
Figure 3B:
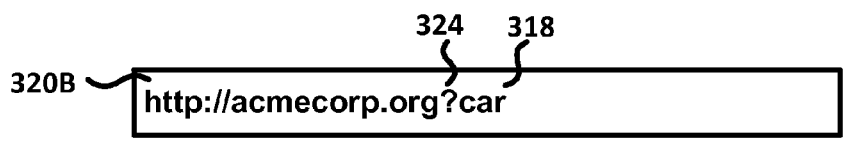
FIG. 3B shows a block diagram of an example of a modified URL.

FIG. 3A, FIG. 3B, FIG. 3C, and FIG. 3D show various stages of techniques for redirecting a user to a web site/page. The web browser 210 on the device 202 can be configured to include a search string box 316, such as shown in FIG. 3A. The search string box 316 can be a plug-in, or built into, the web browser 210. A user can enter one or more search strings 318 into the search string box 316 and either enter a URL 320A into the URL box 212 and press enter or click on a link 322 to the URL 320. Then the web browser 210 can modify the URL 320A in the URL box 212, or the URL 320A corresponding to the link that was clicked on, to a format that the web server 206 recognizes. An example of a formatted URL 320B is shown in FIG. 3B.

In one or more embodiments, the web browser 210 can modify the URL 320A to be sent to the web server 206 to include the search string(s) 318 entered into the search string box 216 or a search string indicator 324. In one or more embodiments, the search string(s) can be delineated from the URL by a space or one or more characters. Alternatively, the web browser 210 can send the URL 320A and the search string 318 to the web server 206 without modifying the URL 320A.

In the example shown in FIG. 3B, the search string indicator 324 is a "?". The search string indicator 324 can be a variety of strings of one or more characters, symbols, numbers, or letters. The search string indicator 324 can indicate where the search string(s) 318 is located in the URL character string. In the example shown in FIG. 3B, the search string 318 "car" immediately follows the search string indicator 324. The search string 318 can be located elsewhere in the modified URL 320B, such as at a location in front of, or following, the search string indicator 324.

The web server 206 can receive the modified URL 320B or the URL 320A and search string 318. At or around the time the web server 206 receives the modified URL 320B the web server 206 can identify the search string(s) 218, such as by identifying the search string indicator 324 and parsing the search string(s) 318 from the URL 320B as a function of the search string indicator 324. The web server 206 can determine if the search string 318 is in the list of valid search strings 326

Figure 3C:
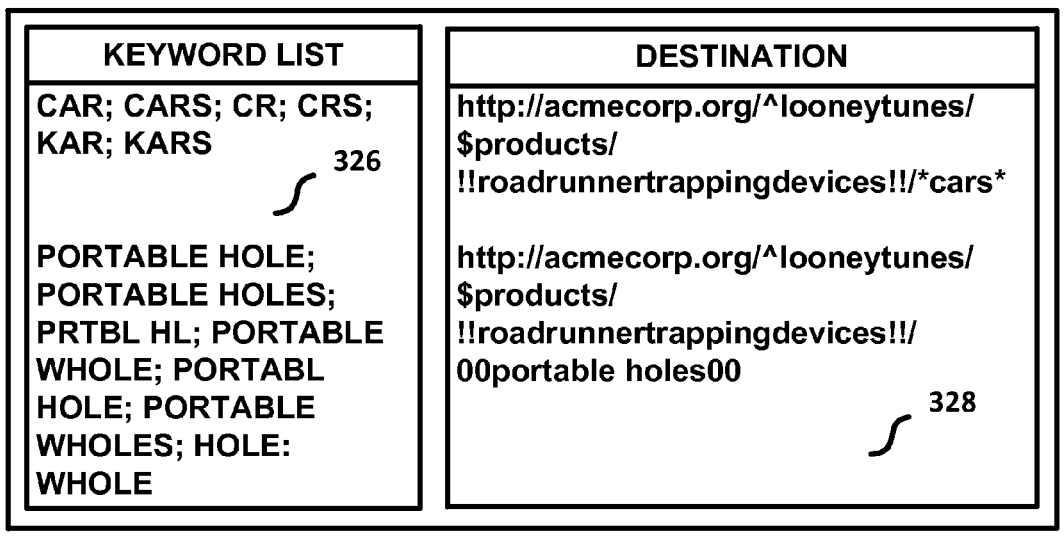
FIG. 3C shows a block diagram of an example of a list of valid search strings and a corresponding suggested URL list.

(shown in FIG. 3C). If the search string 318 is in the list of valid search strings 326, or is sufficiently phonetically similar to a search string in the list of valid search strings 326, the web server 206 can redirect the user's browser 210 to the URL in the URL list 328 that corresponds to the search string 318 in the list of valid search strings 326. In the example shown in FIG. 3C, the search string "car" has a corresponding URL of "http://acmecorp.org/^looneytunes/$products/!!roadrunner-trappingdevices!!/*cars*" in the URL list 328.

When the search string 318 is not in the list of valid search strings 326, or is not sufficiently phonetically similar to a search string 318 in the list of valid search strings 326, the web server 206 can redirect the web browser 210 to a web site/page 300 that displays the list of valid search strings 326 or the corresponding URL list 328. An example of such a web site/page is shown in FIG. 3D.

Figure 3D:
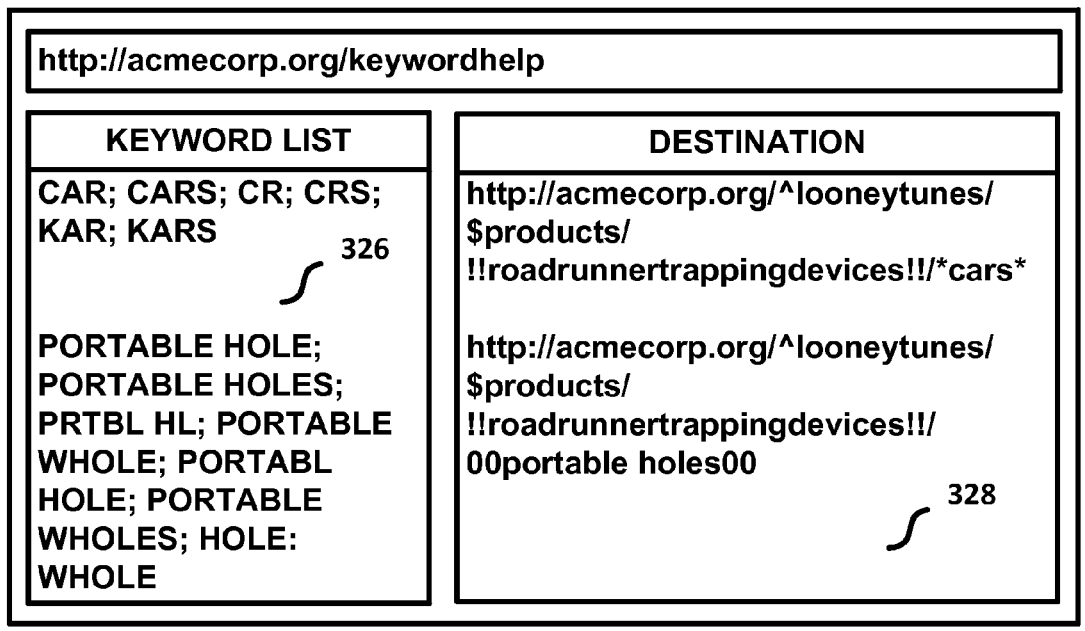
FIG. 3D shows a block diagram of an example of a web site/page that displays the list of valid search strings and the corresponding suggested URL list.

FIG. 3D shows an example of a web site/page 300 that includes a list of valid search strings 326 and a corresponding URL list 328. In the example shown in FIG. 3D the search strings "car; cars; cr; crs; kar; kars" all map to the URL "http://acmecorp.org/^looneytunes/$products/!!roadrunner-trappingdevices!!/*cars*" and the search strings "portable hole; portable holes; prtbl hl; portable whole; portabl hole; portable wholes; hole; whole" all map to the URL "http://acmecorp.org/^looneytunes/$products/!!roadrunnertrap-pingdevices!!/00portable holes00".

FIG. 4A and FIG. 4B show examples of pseudo code 400A and 400B, respectively, to implement techniques of redirecting a user's web browser 210 to a valid URL. In the example shown in FIG. 4A the function titled "Redirect" accepts the variable "keyword" as an input and produces an output "url". This function determines if "keyword" matches a search string in a list of valid search strings 326 and sets "url" equal to a string of characters that corresponds to a matching search string in the list of valid search strings 326 if a match is found. If no matching search string is found then "url" is set equal to a string of characters corresponding to a URL 220 of a web site/page 300 that displays a list of valid search strings 326 or a corresponding suggested URL list 328.

FIG. 4B shows pseudo code for determining if a search string 318 is phonetically similar to a search string in a list of valid search strings 326. If a sufficient phonetic match is identified then the user's browser is redirected to a URL corresponding to the phonetically similar search string. If no sufficiently-phonetically-similar search string is found in the list of valid search strings 326 then "url" is set equal to a string of characters corresponding to a URL 320 of a web site/page 300 that displays a list of valid search strings 326 or a corresponding URL list 328. The pseudo code in FIGS. 4A and 4B can be combined so as to create an algorithm that checks if a received search string is an exact match or a sufficiently phonetically similar match to a search string in the list of valid search strings 326 and returns the URL in the list of URLs that corresponds to the matching search string.

Figure 5:
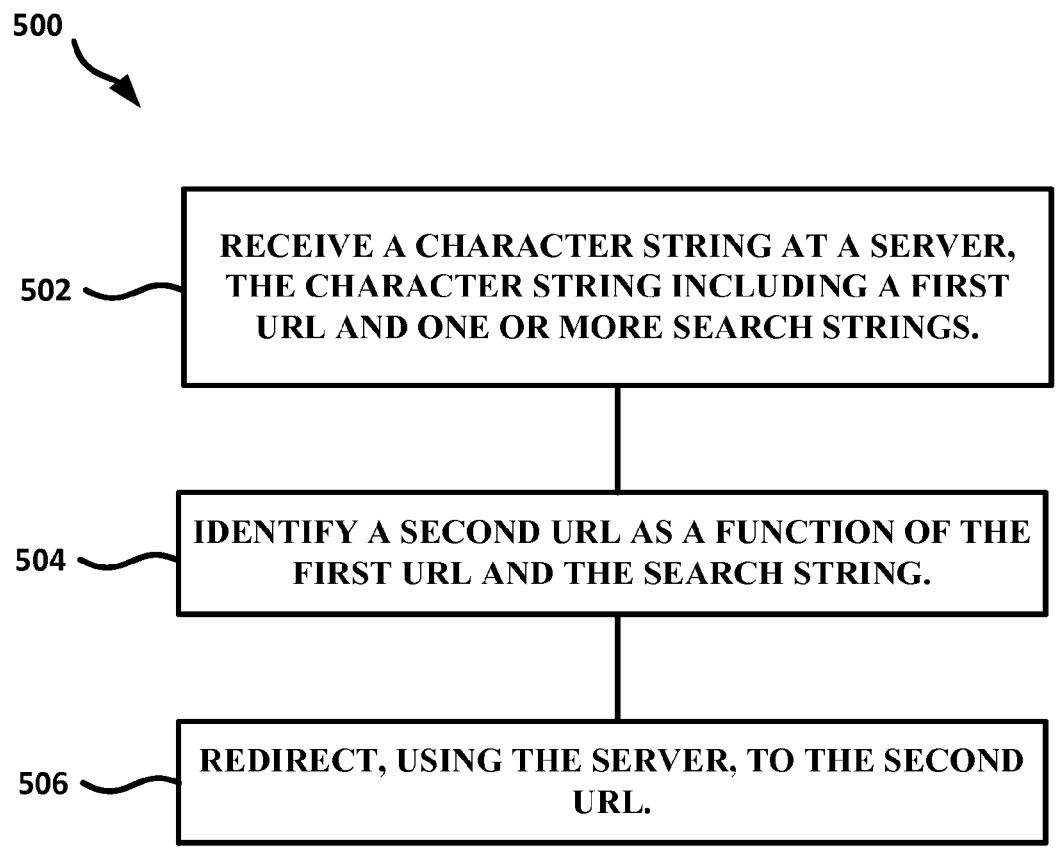
FIG. 5 shows a flow diagram of an example of a technique for semantic URL handling.

FIG. 5 is a flow diagram of an example of a technique for redirecting a web browser 210 to a valid URL when an invalid URL, or a URL 320A and a search string 318, is received at a web server 206. At 502, a character string can be received at a web server 206. The character string can include a first URL 320A and one or more search strings 318. Note that the URL 320A need not be incorrect and does not need to include a valid URL 320A or a valid search string 318. At 504, a second URL can be identified as a function of the first URL 320A and search string 318. At 506, the web server 206 can redirect to the second, valid URL 320B. The redirect can cause the web browser 210 to display the content of the web site/page associated with the second URL 320B.

Figure 6:
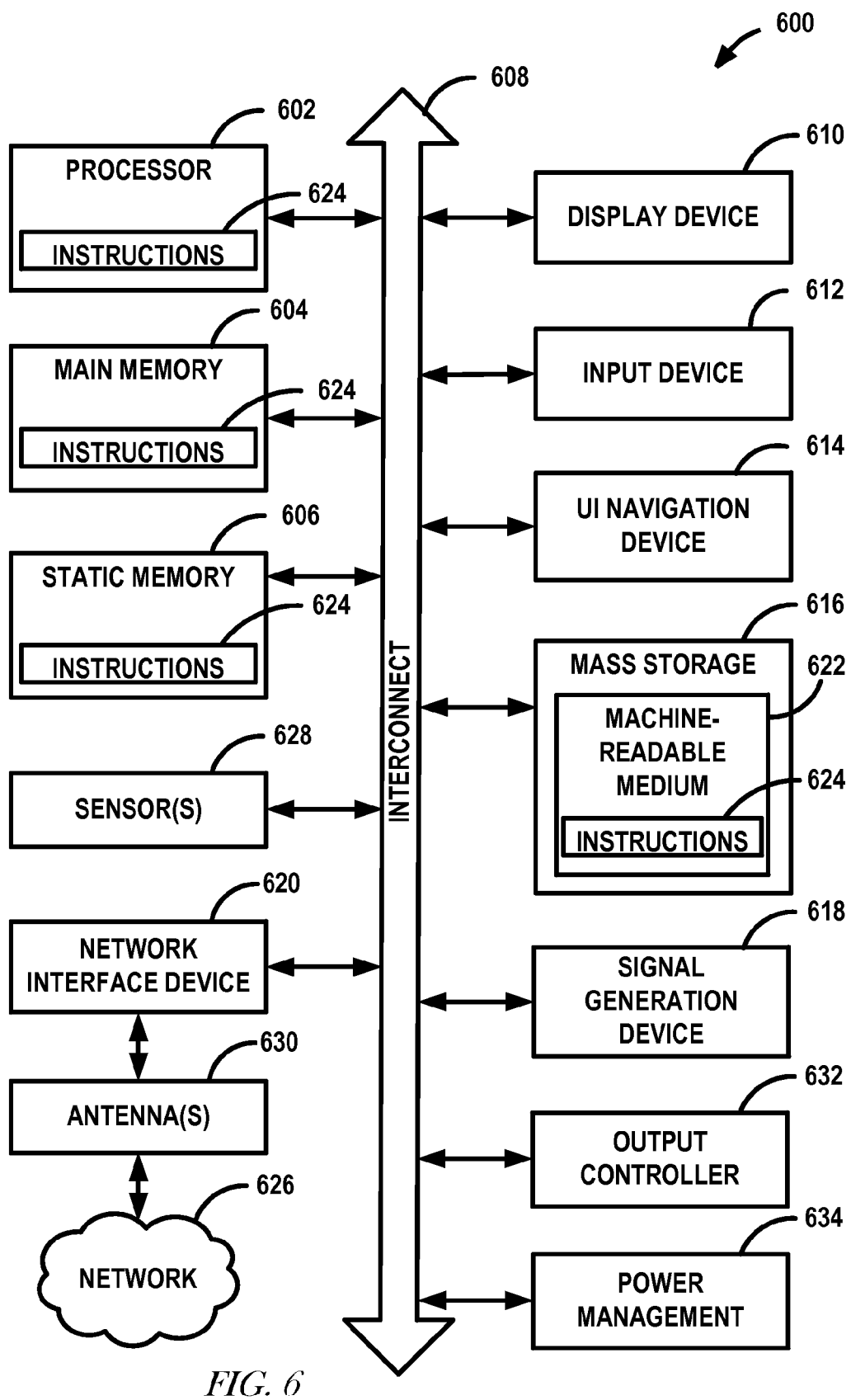
FIG. 6 shows a block diagram of an example of a computer system.

FIG. 6 is a block diagram illustrating an example computer system machine upon which any one or more of the techniques herein discussed may be run, such as a computer system 600 that can be communicatively coupled to a web server 206. In one or more embodiments, a device 202 includes one or more items of computer system 600. Computer system 600 may be embodied as a computing device, providing operations of a device 202 (from FIG. 2), or any other processing or computing platform or component described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The computer system machine may be a personal computer (PC) that may or may not be portable (e.g., a notebook or a netbook), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the techniques discussed herein.

Example computer system 600 includes a processor 602 (e.g., a central processing unit (CPU), a graphics processing unit (GPU) or both), a main memory 604 and a static memory 606, which communicate with each other via an interconnect 608 (e.g., a link, a bus, etc.). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are a touch screen display. The computer system 600 may additionally include a storage device 616 (e.g., a drive unit), a signal generation device 618 (e.g., a speaker), an output controller 632, a power management controller 634, and a network interface device 620 (which may include or operably communicate with one or more antennas 630, transceivers, or other wireless communications hardware), and one or more sensors 628, such as a GPS sensor, compass, location sensor, accelerometer, or other sensor.

The storage device 616 includes a machine-readable medium 622 on which is stored one or more sets of data structures and instructions 624 (e.g., software) embodying or utilized by any one or more of the techniques or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the techniques of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes and Examples

In Example 1 a technique includes receiving a character string at a server, the character string including a first universal resource locator (URL) and one or more search strings.

In Example 2, the technique of Example 1 includes identifying a second URL as a function of the first URL and the search string.

In Example 3, the technique of at least one of Examples 1-2 includes redirecting, using the server, to the second URL.

In Example 4, the one or more search strings of at least one of Examples 1-3 is delineated from the URL.

In Example 5, receiving the character string of at least one of Examples 1-4 includes receiving a search string indicator that indicates that the one or more letters or symbols following the search string indicator are the one or more search strings.

In Example 6, the technique of at least one of Examples 1-5 includes configuring a process file of the web server to intercept URL error messages.

In Example 7, the technique of at least one of Examples 1-6 includes configuring the process file to include a list of search strings and a corresponding URL associated with each search string in the list.

In Example 8, the technique of at least one of Examples 1-7 includes, before configuring the process file to include the list of search strings, producing a list of phonetically similar words and including the phonetically similar words in the list of search strings.

In Example 9, sending the request including the second URL of at least one of Examples 1-8 includes sending the request including the second URL when a first search string is found in the search and includes sending the request including the same second URL when a second, different search string is found.

In Example 10, the technique of at least one of Examples 1-9 includes, when the one or more search strings received does not match any of the search strings on the list of valid search strings, sending the request including the second URL includes sending the request including the second URL, wherein the second URL points to a webpage configured to display the list of search strings.

In Example 11, a web server is configured to receive a first Uniform Resource Locator (URL).

In Example 12, the web server of at least one of Examples 1-11 is configured to identify one or more search strings in the URL.

In Example 13, the web server of at least one of Examples 1-12 is configured to identify the one or more search strings in a list of valid search strings.

In Example 14, the web server of at least one of Examples 1-13 is configured to redirect a web browser to a second, valid URL as function of the one or more search strings.

In Example 15, the web server of at least one of Examples 1-14 is further configured to search the first URL for a search string indicator that indicates that the one or more letters or symbols following the search string indicator are search strings.

In Example 16, the web server of at least one of Examples 1-15 is further configured to redirect to the same second, valid URL when one or more different search strings are found.

In Example 17, the web server of at least one of Examples 1-16 includes a process file, the process file configured to intercept URL error messages and include the list of valid search strings and a corresponding URL associated with each search string in the list.

In Example 18, the process file of at least one of Examples 1-17 includes at least one of XML code, information formatted in a flat file format, and a comma separated values list that includes the list of search strings and corresponding URL associated with each search string in the list.

In Example 19, the list of search strings of at least one of Examples 1-18 includes phonetically similar words.

In Example 20, the web server of at least one of Examples 1-19 is further configured to, when the one or more search strings found does not match any of the search strings on a list of valid search strings, reformat the first URL to a second, valid URL that points to a web site configured to display the list of valid search strings.

In Example 21, a computer readable storage device includes instructions stored thereon, the instructions, which when executed by a machine, cause the machine to perform operations including receiving a character string at a server, the character string including a first universal resource locator (URL) and one or more search strings.

In Example 22, the computer readable storage device of at least one of Examples 1-21 further includes instructions, which when executed by the machine, cause the machine to perform operations including identifying a second URL as a function of the first URL and the search string.

In Example 23, the computer readable storage device of at least one of Examples 1-22 further includes instructions, which when executed by the machine, cause the machine to perform operations including redirecting, using the server, to a second, valid URL.

In Example 24, the computer readable storage device of at least one of Examples 1-23 includes instructions, which when executed by the machine, cause the machine to perform operations including, when the one or more search strings received does not match any of the search strings on the list of valid search strings, redirecting to the second URL includes redirecting to the second URL, wherein the second URL points to a webpage configured to display the list of search strings.

In Example 25, the instructions for sending the request including the second URL of at least one of Examples 1-24 include instructions which, when executed by the machine, cause the machine to perform operations including redirecting to the second URL after a first search string is found in the search and includes redirecting the same second URL after a second, different search string is found.

In Example 26, the instructions for receiving the character string of at least one of Examples 1-25 include instructions, which when executed by the machine, cause the machine receive a search string indicator that indicates that the one or more letters or symbols following the search string indicator are the one or more search strings.

In Example 27, the computer readable storage device of at least one of Examples 1-26 includes instructions, which when executed by the machine, cause the machine to perform operations including configuring a process file of the web server to intercept URL error messages.

In Example 28, the computer readable storage device of at least one of Examples 1-27 includes instructions, which when executed by the machine, cause the machine to perform operations including configuring the process file to include a list of search strings and a corresponding URL associated with each search string in the list.

In Example 29, the computer readable storage device of at least one of Examples 1-28 includes instructions, which when executed by the machine, cause the machine to perform operations including, before configuring the process file to include the list of search strings, producing a list of phonetically similar words and including the phonetically similar words in the list of search strings.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, techniques and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
receiving a character string at a server, the character string including a first universal resource locator (URL), a search string, and a search string indicator, the search string indicator indicating string that the search string immediately follows the search string indicator;
intercepting a URL error message using a process file of the server, the process file including a list of valid search strings and a corresponding URL associated with each valid search string in the list;
identifying a second, valid URL corresponding to the search string in the list of valid search strings as a function of the first URL, the second URL referencing a webpage having content corresponding to the search string; and
redirecting, using the server, to the second URL.

2. The method of claim 1, further comprising:
before configuring the process file to include the list of valid search strings, producing a list words phonetically similar to a valid search string in the list of valid search strings and including the phonetically similar words in the list of search strings.

3. The method of claim 1, wherein redirecting to the second URL includes sending the request including the second URL when a first search string is found in the search and includes redirecting to the same second URL when a second, different search string is found.

4. The method of claim 1, further comprising:
when the search string received does not match any of the search strings on the list of valid search strings, redirecting to the second URL includes redirecting to a URL that points to a webpage configured to display the list of search strings.

5. A web server configured to:
receive a character string including a first Uniform Resource Locator (URL), a search string, and a search string indicator, the search string indicator string that the search string immediately follows the search string indicator;
intercept a URL error message using a process file of the server, the process file including a list of valid search strings and a corresponding URL associated with each valid search string in the list;
identify the search string in the character string; identify the search string in the list of valid search strings; and redirect to a second, valid URL corresponding to the search string in the list of valid search strings as function of the first URL, the second URL referencing a webpage having content corresponding to the search string.

6. The web server of claim 5, wherein the web server is further configured to redirect to the same second, valid URL when one or more different search strings are found.

7. The web server of claim 5, wherein the process file includes at least one of XML code, information formatted in a flat file format, and a comma separated values list that includes the list of search strings and corresponding URL associated with each search string in the list.

8. The web server of claim 5, wherein the list of search strings includes phonetically similar search strings.

9. The web server of claim 5, the web server further configured to, when the search string found does not match any of the search strings on the list of valid search strings, reformat the first URL to a third, valid URL that points to a web site configured to display a list of valid search strings.

10. A computer readable storage device including instructions stored thereon, the instructions, which when executed by a machine, cause the machine to perform operations comprising:
receiving a character string at a server, the character string including a first, valid universal resource locator (URL), a search string, and a search string indicator, the search string indicator indicating where character string that the search string immediately follows the search string indicator;
intercepting a URL error message using a process file of the server, the process file including a list of valid search strings and a corresponding URL associated with each valid search string in the list;
identifying a second, valid URL corresponding to the search string in the list of valid search strings as a function of the first URL the second URL referencing a webpage having content corresponding to the search string; and
redirecting, using the server, to the second URL.

11. The computer readable storage device of claim 10, further comprising instructions, which when executed by the machine, cause the machine to perform operations comprising:

when the search string received does not match any of the search strings on a list of valid search strings, redirecting to a third, valid, wherein the third URL points to a webpage configured to display the list of valid search strings.

12. The computer readable storage device of claim 10, wherein the instructions for redirecting to the second URL include instructions which, when executed by the machine, cause the machine to redirect to the second URL after a first search string is found in the search and includes redirecting to the same second URL after a second, different search string is found.

13. The computer readable storage device of claim 10, further comprising instructions, which when executed by the machine, cause the machine to perform operations comprising:

before intercepting a URL error message using a process file of the server, producing a list of search strings phonetically similar to a search string in the list of search string and including the phonetically similar search strings in the list of valid search strings.

14. The method of claim 1, further comprising:

producing a list of words phonetically similar to each search string in a list of valid search string and including the phonetically similar words in a list of valid search strings; configuring a process file of the web server to intercept URL error messages and to include the list of valid search strings and a corresponding URL associated with each valid search string in the list; and wherein redirecting to the second URL includes redirecting to a URL that points to a subpage of the first URL configured to display the list of valid search strings in response to determining the one or more search strings received does not match any of the search strings on the list of valid search strings.

* * * * *